(12) United States Patent
Brockman et al.

(10) Patent No.: US 7,254,922 B2
(45) Date of Patent: Aug. 14, 2007

(54) SELECTIVELY RELEASABLE AND PIVOTABLE SIDE CURTAIN ASSEMBLY

(75) Inventors: Thomas R. Brockman, Kenton, OH (US); Mark Dillon, Upper Sandusky, OH (US); Dale Kreais, Upper Sandusky, OH (US)

(73) Assignee: Fairborn USA, Inc., Upper Sandusky, OH (US)

( * ) Notice: Subject to any disclaimer, the term of this patent is extended or adjusted under 35 U.S.C. 154(b) by 69 days.

(21) Appl. No.: 10/406,261

(22) Filed: Apr. 4, 2003

(65) Prior Publication Data

US 2004/0000105 A1 Jan. 1, 2004

Related U.S. Application Data

(60) Provisional application No. 60/412,801, filed on Sep. 24, 2002, provisional application No. 60/386,750, filed on Jun. 10, 2002, provisional application No. 60/369,604, filed on Apr. 4, 2002.

(51) Int. Cl.
*E04B 1/00* (2006.01)
*E04H 14/00* (2006.01)

(52) U.S. Cl. ........ 52/173.2; 52/716.2; 52/717.01; 52/718.01; 52/210; 52/212

(58) Field of Classification Search ....... 52/173.2, 52/716.1, 716.3, 716.4, 717.01, 718.01, 2.12, 52/204.1, 210, 213
See application file for complete search history.

(56) References Cited

U.S. PATENT DOCUMENTS

| | | | | |
|---|---|---|---|---|
| 2,567,995 A * | 9/1951 | Eshnaur | .............. | 52/173.2 |
| 3,352,314 A * | 11/1967 | Frommelt et al. | ......... | 52/173.2 |
| 3,614,604 A * | 10/1971 | Reinshagen | ............. | 324/216 |
| 3,641,604 A * | 2/1972 | Eggert, Jr. | ............ | 14/71.5 |
| 3,644,952 A * | 2/1972 | Hatch | ............... | 14/71.5 |
| 3,699,733 A * | 10/1972 | Frommelt et al. | ......... | 52/173.2 |
| 3,772,839 A * | 11/1973 | Timbers | ............... | 52/173.2 |
| 3,994,103 A * | 11/1976 | Ouellet | ................ | 52/2.13 |
| 4,020,607 A * | 5/1977 | Bjervig | ............... | 52/173.2 |
| 4,120,067 A * | 10/1978 | Hone et al. | ........... | 14/71.5 |
| 4,333,195 A * | 6/1982 | Lichti | ................ | 14/71.5 |
| 4,422,199 A * | 12/1983 | Frommelt | ........... | 14/71.1 |
| 4,495,737 A * | 1/1985 | Alten | ................. | 52/173.2 |
| 4,805,362 A * | 2/1989 | Frommelt et al. | ......... | 52/173.2 |
| 4,825,607 A * | 5/1989 | Frommelt et al. | ......... | 52/173.2 |
| 4,873,801 A * | 10/1989 | Winters | ............... | 52/173.2 |

(Continued)

*Primary Examiner*—Jeanette Chapman
(74) *Attorney, Agent, or Firm*—Birch, Stewart, Kolasch & Birch, LLP

(57) ABSTRACT

A selectively releasable side curtain is provided with at lease one zipper member having a first portion secured to the side pad and a second portion secured to the side curtain for selectively, releasably securing the side curtain relative to the side pad. In a second embodiment, a snap stud and snap button member is provided having one snap stud or snap button that is secured to the side pad and a second snap button or snap stud secured to the side curtain for selectively, releasably securing the side curtain relative to the side pad. The side curtain is selectively pivotable mounted relative to the side curtain for being selectively moved from an operative position to a storage position. In addition, at lease one threaded fastener is provided and secured to the side pad and the side curtain for selectively, releasable securing the side curtain relative to the side pad.

5 Claims, 5 Drawing Sheets

U.S. PATENT DOCUMENTS

| | | | |
|---|---|---|---|
| 4,943,110 A * | 7/1990 | Pastva | 296/186.2 |
| 5,125,196 A * | 6/1992 | Moody | 52/173.2 |
| 5,185,977 A * | 2/1993 | Brockman et al. | 52/173.2 |
| 5,282,342 A * | 2/1994 | Brockman et al. | 52/173.2 |
| 5,341,613 A * | 8/1994 | Brockman et al. | 52/173.2 |
| 5,345,733 A * | 9/1994 | Brockman et al. | 52/173.2 |
| 5,553,424 A * | 9/1996 | Brockman et al. | 52/2.12 |
| 5,608,996 A * | 3/1997 | Brockman et al. | 52/173.2 |
| 5,622,016 A * | 4/1997 | Frommelt et al. | 52/173.2 |
| 5,927,025 A * | 7/1999 | Brockman et al. | 52/173.2 |
| 5,953,868 A * | 9/1999 | Giuliani et al. | 52/173.2 |
| 6,311,435 B1 * | 11/2001 | Brockman et al. | 52/173.2 |

* cited by examiner

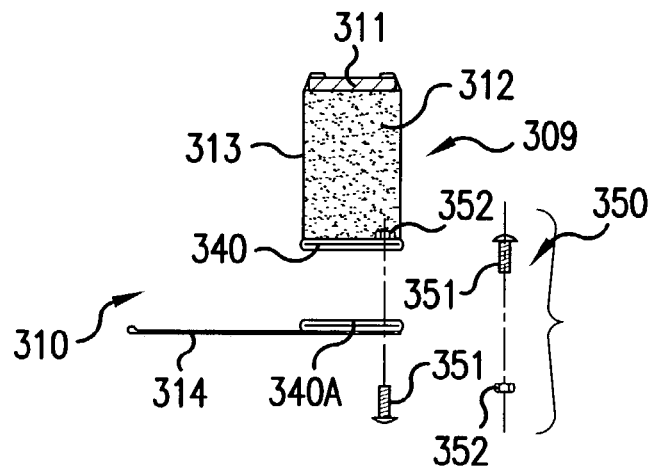
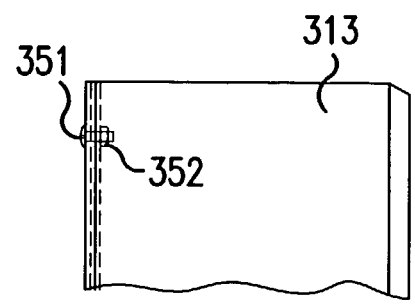
FIG.17
FIG.18
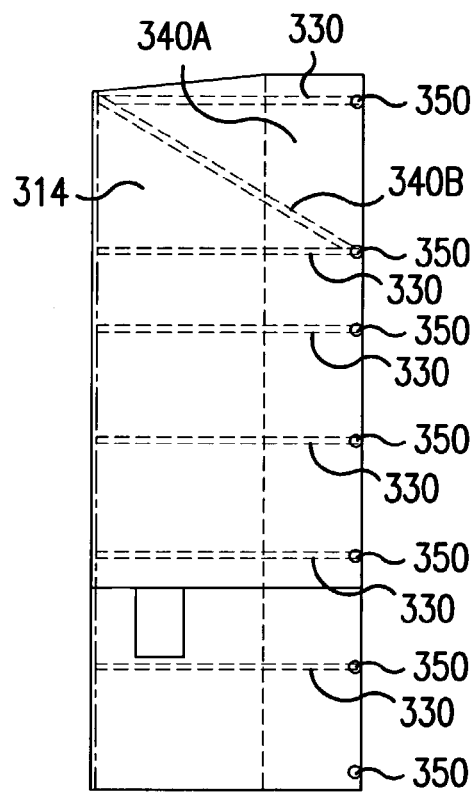
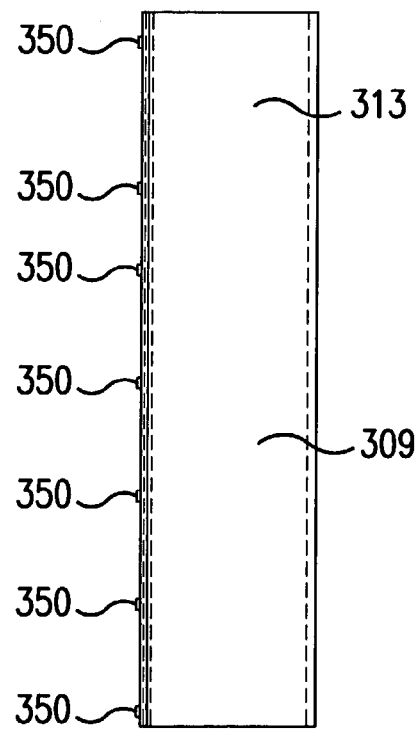
FIG.19
FIG.20

SELECTIVELY RELEASABLE AND PIVOTABLE SIDE CURTAIN ASSEMBLY

CROSS-REFERENCE TO RELATED APPLICATIONS

The present nonprovisional application claims priority under 35 USC 120 to provisional Application Nos. 60/369,604 filed on Apr. 4, 2002; 60/386,750 filed on Jun. 10, 2002 and 60/412,801 filed on Sep. 24, 2002 the entire contents thereof are hereby incorporated by reference.

BACKGROUND OF THE INVENTION

Field of the Invention

The present invention relates to a side curtain assembly that is selectively releasable removable from a side pad to permit a side curtain to be selectively releasable relative to a side pad. In addition, the side curtain assembly may be pivotable to be selectively moved from an operative position for use in engaging an outer surface of a trailer or truck to form a seal to a storage position for being out of engagement with the outer surface of the trailer or truck. Further, fastener attachments may be provided for a side curtain assembly that permit a side curtain to be selectively releasable removable from a side pad.

SUMMARY AND OBJECTS OF THE INVENTION

It is an object of the present invention to permit a side curtain to be selectively releasable from a side pad or side member by means of a zipper or snaps to provide a positive attachment of the side curtain to the side pad or side member to permit the side curtain to be selectively releasable relative to a side pad or side member.

This object of the present invention is achieved by providing a dock closure including a side pad adapted for mounting relative to a dock opening. A selectively releasable side curtain is provided for being selectively, releasable mounted relative to the side pad. At least one zipper member is provided having a first portion secured to the side pad and a second portion secured to the side curtain for selectively, releasably securing the side curtain relative to the side pad.

In another embodiment, a dock closure includes a side pad adapted for mounting relative to a dock opening. A selectively releasable side curtain is provided for being selectively, releasable mounted relative to the side pad. At least a snap and button member is provided having one of the snap studs secured to the side pad and a second one of the snap buttons secured to the side curtain for selectively, releasably securing the side curtain relative to the side pad.

It is another object of the present invention to provide a side curtain that is selectively pivoted from an operative position for use in engaging an outer surface of a trailer or truck to form a seal to a storage position for being out of engagement with the outer surface of the trailer or truck.

This object of the present invention is achieved by providing a dock closure including a side curtain with a hinge mounted along a vertical side of a side pad for permitting the side curtain to be selectively pivoted from an operative position for use in engaging an outer surface of a trailer or truck to form a seal to a storage position for being out of engagement with the outer surface of the trailer or truck.

In a further embodiment, the side curtain is sewn to a fabric covering the side pad for permitting the side curtain to be selectively pivoted from an operative position for use in engaging an outer surface of a trailer or truck to form a seal to a storage position for being out of engagement with the outer surface of the trailer or truck. In this embodiment, stays for providing stiffeners for the side curtain may be removably mounted for permitting the side curtain to be folded along the side pad during storage.

In the embodiment that includes a hinge, one side of the side curtain may be releasable mounted relative to one side of the side pad by means of a zipper member that is provided having a first portion secured to the one side of the side pad and a second portion secured to the one side of the side curtain for selectively, releasably securing the one side of the side curtain relative to the one side of the side pad. The fastening member for securing the one side of the side curtain to the one side of the side pad may be a snap and button arrangement, hook and loop, a dual lock or any other means of securing one member to another.

It is a further object of the present invention to provide a fastener attachment for permitting a side curtain to be selectively releasable removable from a side pad by means of a threaded fastener or other mechanical means to provide a positive attachment of the side curtain to the side pad to permit the side curtain to be selectively releasable removable relative to a side pad.

This object of the present invention is achieved by providing a dock closure including a side pad adapted for mounting relative to a dock opening. A selectively releasable side curtain is provided for being selectively, releasable mounted relative to the side pad. At lease one fastener attachment is provided having a portion secured to at least one of the side pad and side curtain for selectively, releasable securing the side curtain relative to the side pad.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given herein below and the accompanying drawings which are given by way of illustration only, and thus are not limitative of the present invention, and wherein:

FIG. 17 is a top cross-sectional view illustrating a side pad with a side curtain detachably positioned adjacent thereto of fifth embodiment of the present invention;

FIG. 18 is a partial side view illustrating a fastener attachment for securing the side curtain to the side pad;

FIG. 19 is an elevational view illustrating the side curtain secured to the side pad; and FIG. 20 is an elevational view illustrating a plurality of fastener attachments for securing the side curtain to the side pad.

DETAILED DESCRIPTION OF THE PREFERRED EMBODIMENTS

Figure 1:
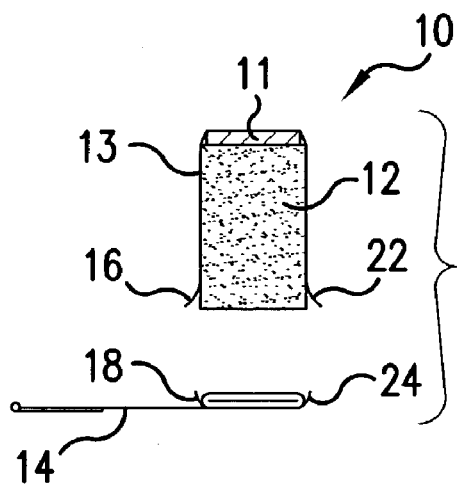
FIG. 1 is a top cross-sectional view illustrating a pad member with a curtain detachably positioned adjacent thereto.
Figure 2:
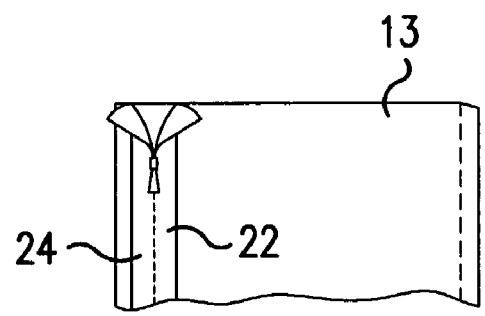
FIG. 2 is a partial side view illustrating a zipper for securing the curtain member to the pad member.

As illustrated in FIGS. 1-4 the first embodiment of the present invention is set forth wherein a selectively releasable side curtain/side member assembly 10 is provided with a wood frame 11 adapted to be mounted adjacent to an opening of a building. A foam core 12 is positioned on the wood frame 11 with a fabric member 13 disposed therearound. A zipper member 16 is secured to one end of the base fabric 13. Similarly a zipper member 22 is secured to the other end of the base fabric 13. A curtain member 14 is positioned for attachment to the base fabric 13. A corresponding zipper member 18 for mating with the zipper member 16 is positioned adjacent to the curtain member 14. Similarly, a zipper member 24 adapted to mate with the zipper member 22 is positioned adjacent to a second end of the curtain 14. The zipper member 22, 24 and 16, 18 are designed to permit the curtain 14 to be selectively releasably secured relative to the base fabric 13.

It should be noted that the side member assembly 10 may be a fixed frame member which does not include foam. In addition, the side pad or core member 12 may be constructed of any material to ensure the operativeness of the present invention.

Figure 3:
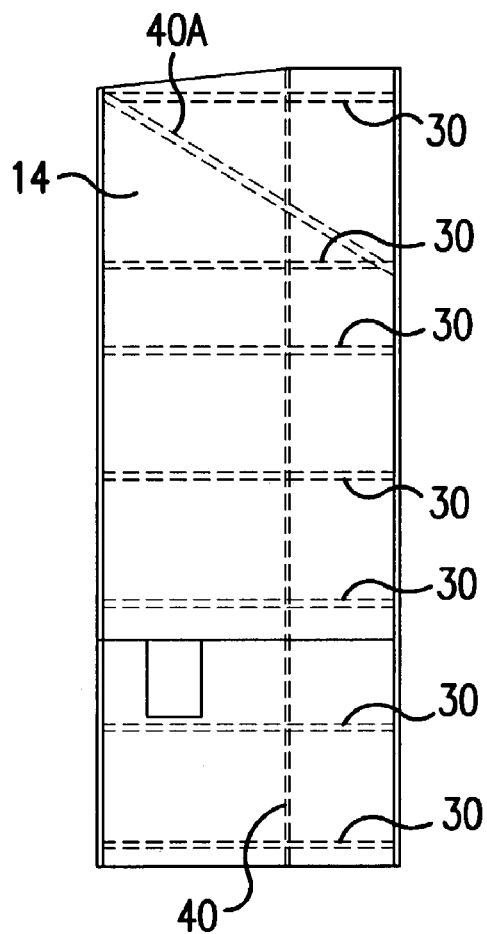
FIG. 3 is an elevational view illustrating the curtain member secured to the pad member.
Figure 4:
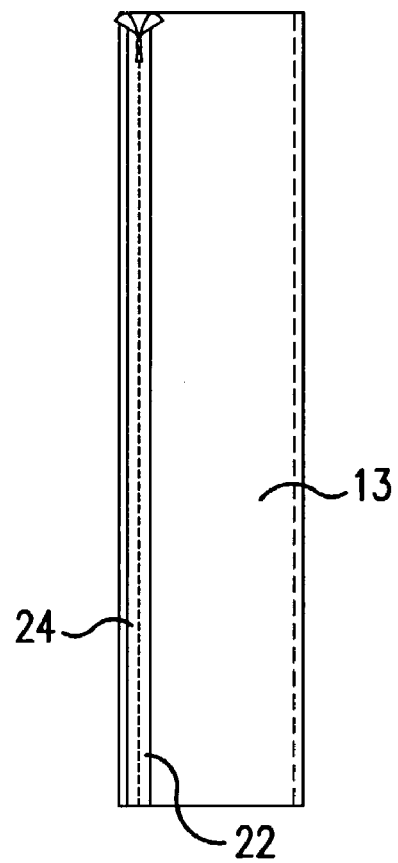
FIG. 4 is an elevational view illustrating the zipper securing the curtain member to the side pad assembly.
Figure 5:
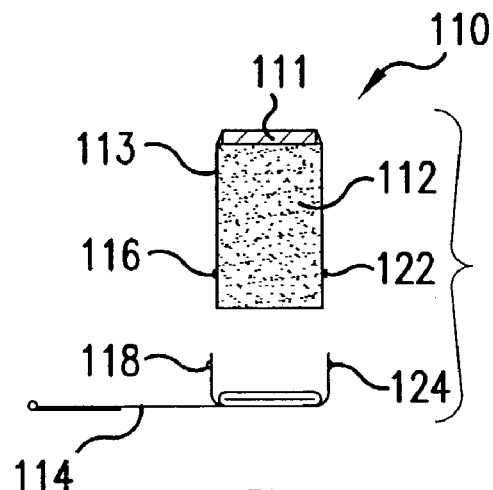
FIG. 5 is a cross-sectional view illustrating a side pad with a curtain member positioned adjacent thereto having snap studs and snap buttons for securing the curtain member to the side pad assembly according to a second embodiment of the present invention.
Figure 6:
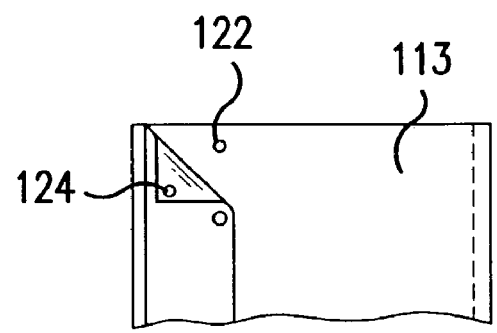
FIG. 6 is a partial side view illustrating the snap stud and snap button assembly.

As illustrated in FIG. 3, the curtain member 14 includes resilient stays 30 which extend horizontally relative thereto. In addition, a vertical stay 40 together with a cross-stay 40A are disposed within the side curtain member 14. The vertical stiffener 40 and the cross stiffener 40A may be optionally deleted from the present invention.

As illustrated in FIGS. 5-8 a second embodiment of the present invention is set forth wherein a selectively releasable side curtain/side member assembly 110 is provided with a wood frame 111 adapted to be mounted adjacent to an opening of a building. A foam core 112 is positioned on the wood frame 111 with a fabric member 113 disposed therearound. A snap stud member 122 is secured to one end of the base fabric 113. Similarly a snap stud member 122 is secured to the other end of the base fabric 113. A curtain member 114 is positioned for attachment to the base fabric 113. A corresponding snap button member 118 for mating with the snap stud member 116 is positioned adjacent to the curtain member 114. Similarly, a snap button member 124 adapted to mate with the snap stud member 122 is positioned adjacent to a second end of the curtain 114. A plurality of the snap button snap stud members 122, 124 and 116, 118 are arranged along the curtain member 114 and the base fabric 113 and are designed to permit the curtain 114 to be selectively releasably secured relative to the base fabric 113.

It should be noted that the side member assembly 112 may be a fixed frame member which does not include foam. In addition, the side pad or core member 112 may be constructed of any material to ensure the operativeness of the present invention.

Figure 7:
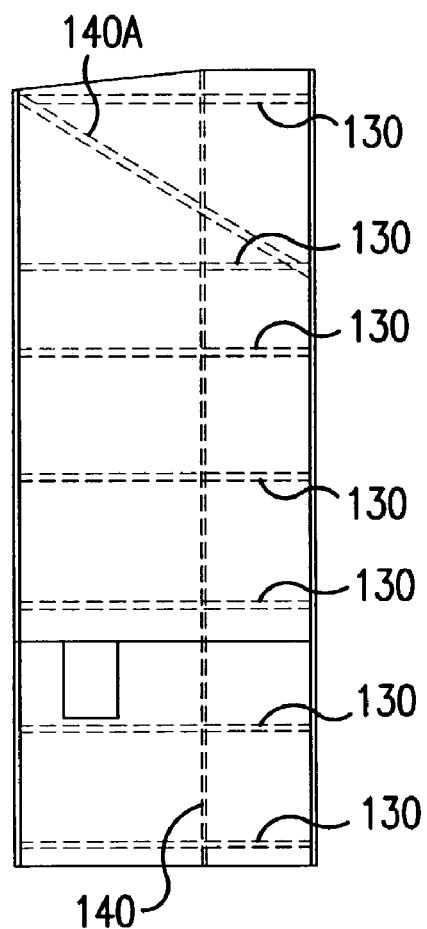
FIG. 7 is an elevational view illustrating the side curtain secured to a side pad assembly.
Figure 8:
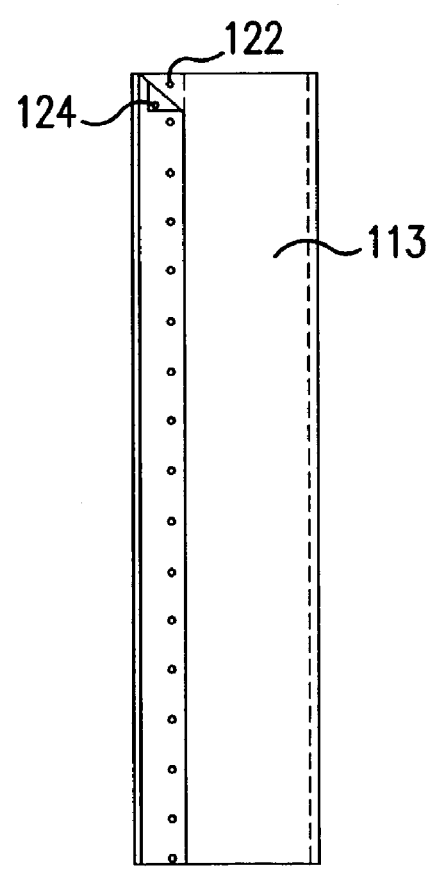
FIG. 8 is an elevational view illustrating the snap stud and snap button attachment for securing the side curtain to the pad assembly.
Figure 9:
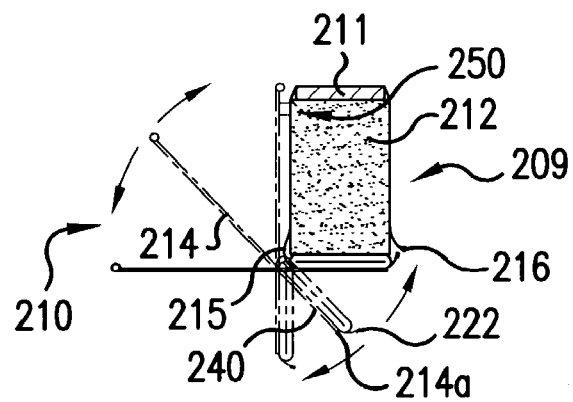
FIG. 9 is a cross-sectional view illustrating a side pad member with a side curtain illustrated as pivotably positioned adjacent one side of the side curtain to be movable from an operative position to a storage position according to a third embodiment of the present invention.
Figure 11:
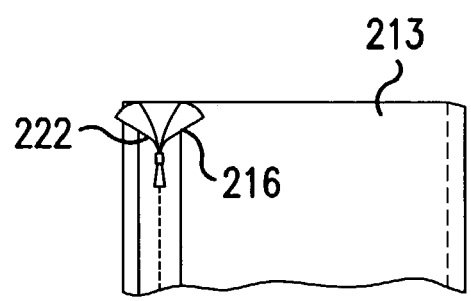
FIG. 11 is an enlarged view illustrating a zipper attachment for securing one side of the side curtain to one side of the side pad member.

As illustrated in FIG. 7, the curtain member 114 includes resilient stays 130 which extend horizontally relative thereto. In addition, a vertical stay 140 together with a cross-stay 140A are disposed within the side curtain member 114. The vertical stiffener 140 and the cross stiffener 140A may be optionally deleted from the present invention.

As illustrated in FIGS. 9-12 a third embodiment of the present invention is set forth wherein a side curtain/side pad assembly 210 is provided with a wood frame 211 adapted to be secured to an opening of a building. A side pad 209 includes a foam core 212 positioned on the wood frame 211 with a base fabric member 213 disposed therearound. A zipper member 216 is secured to one end of the base fabric member 213. Similarly a zipper member 222 is secured to the one side 214a of the side curtain 214. The side curtain 214 is hinged at 215 to the side pad 209 for permitting the side curtain 214 to be moved from an operative position wherein the side curtain 214 is disposed to engage the side of a trailer or truck to a storage position wherein the side curtain is aligned with the side pad to be out of engagement with the side of a trailer or truck.

The zipper member 216 is designed to mate with the zipper member 222 for securing the side curtain 214 to be substantially orthogonal relative to the side pad 209. In this position, the side curtain 214 is in an operative position wherein the side curtain 214 will engage with the side of a trailer or truck when a trailer or truck is parked at the loading dock. When it is desired to store the side curtain, the zipper 216, 222 is unfastened and the curtain member 214 is pivoted from an operative position to a storage position. In the storage position, the side curtain 214 is aligned with the side pad to be out of engagement with the side of a trailer or truck.

It should be noted that the side pad 209 may be a fixed frame member which does not include foam. In addition, the side pad may be constructed of any material to ensure the operativeness of the present invention.

Figure 10:
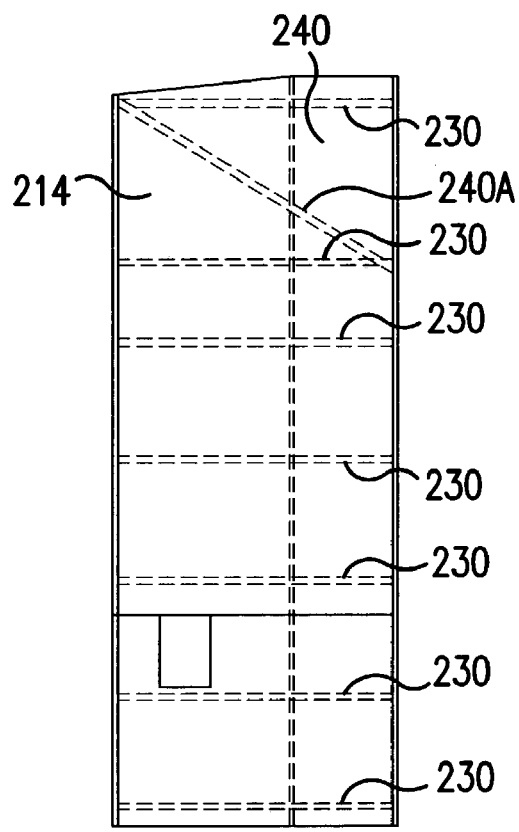
FIG. 10 is a front elevational view illustrating the side curtain in an open or operative position relative to the side pad member.
Figure 12:
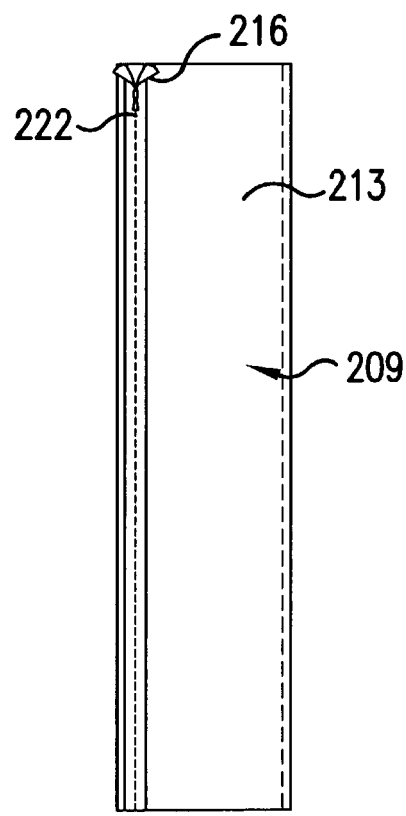
FIG. 12 is an elevational view illustrating the zipper securing the one side of the side curtain member to the one side of the side pad.

As illustrated in FIG. 10, the side curtain 214 includes resilient stays 230 which extend horizontally or at an angle relative thereto. In addition, a vertical stay 240 with a cross-stay 240A may be disposed within the side curtain 214. The vertical stiffener 240 and the cross-stiffener 240A may be optionally deleted from the present invention.

The side curtain 214 may be secured to the side pad 209 by any means such as snap and buttons, hook and loop, dual locks or any other means for securing the side curtain 214 to the side pad 209.

As illustrated in FIGS. 13-16 a fourth embodiment of the present invention is set forth wherein a side curtain/side pad assembly 2110 is provided with a wood frame 2111 adapted to be mounted to an opening of a building. A foam core 2112 is positioned on the wood frame 2111 with a base fabric member 2113 disposed therearound.

Figure 14:
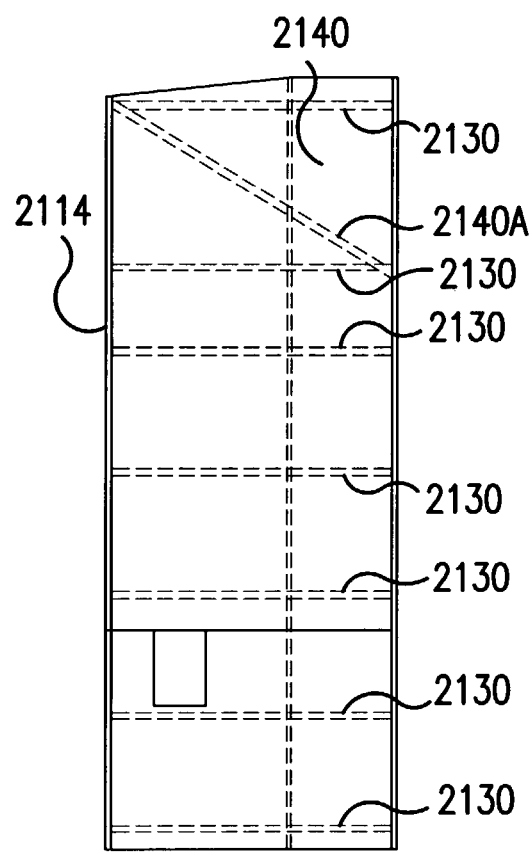
FIG. 14 is an elevational view illustrating the side curtain in an open, operative position.
Figure 16:
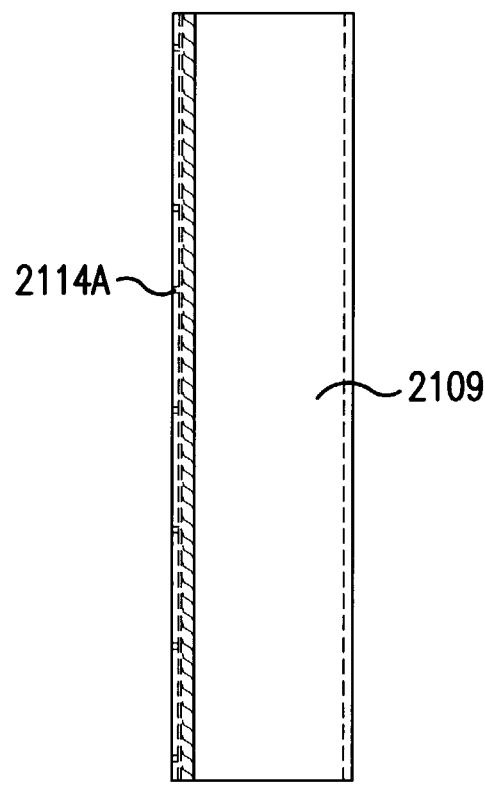
FIG. 16 is an elevational view illustrating a side of the side pad.

As illustrated in FIG. 14, the curtain member 2114 includes resilient stays 2130 which extend horizontally or at an angle relative thereto. In addition, a vertical stay 2140 with a cross-stay 2140A is disposed within a side curtain member 2114. The vertical stiffener 2140 and the cross-stiffener 2140A may be optionally deleted from the present invention.

Figure 13:
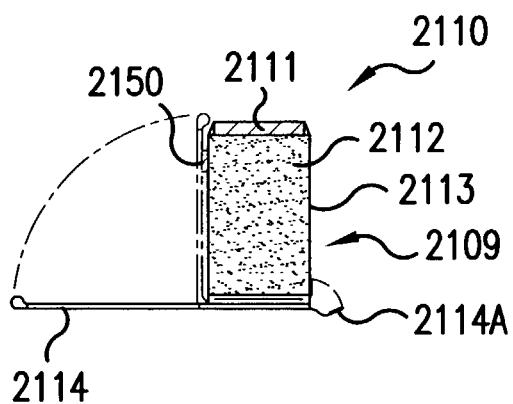
FIG. 13 is a cross-sectional view illustrating a fourth embodiment wherein the side curtain is sewn to one side of the side pad for permitting the side curtain to be pivoted relative to the side pad from an operative position to a storage position.
Figure 15:
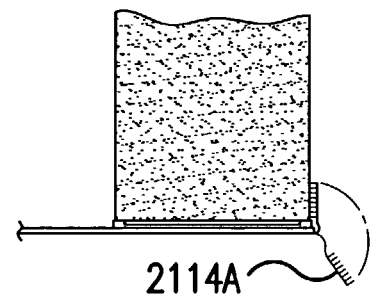
FIG. 15 is a cross-sectional view illustrating the side curtain secured to a side pad.

The side curtain 2114 is sewn to the base fabric member 2113 to permit the side curtain 2114 to be pivotably mounted relative to the side pad 109. One side 2114a of the side curtain 2114 includes a vertical fabric flap with hook and loop for selectively permitting the one side 2114a of the side curtain 2114 to be opened for removal of the stays 2130 for storage of the side curtain 2114. As illustrated in FIG. 13, when the stays 2130 are removed from the side curtain 2114, the side curtain 2114 may be folded to be aligned with the side pad 2109. Hook and loop tabs 2150 may be provided for retain the side curtain 2114 relative to the side pad 2109 during storage.

It should be noted that the side pad 2109 may be a fixed frame member which does not include foam. In addition, the side pad 2109 may be constructed of any material to ensure the operativeness of the present invention.

As illustrated in FIGS. 17-20 a fifth embodiment of the present invention is set forth wherein a selectively releasable side member assembly 310 is provided with a wood frame 311 adapted to be mounted to an opening of a building. A foam core 312 is positioned on the wood frame 311 with a base fabric 313 disposed therearound. The foam core 312 with the base fabric 313 forms the side pad 309. A fastener attachment 350 includes a nut 352 that is secured to a vertical stiffener 340 mounted on the side pad 309. Similarly, a thread fastener 351 is secured to a vertical stiffener 340A mounted on a side curtain 314. The side curtain 314 is positioned for attachment to the side pad 309. The fastener attachment 350 is designed to permit the side curtain 314 to be selectively releasably secured relative to the side pad 309. The fastener attachment 350 provides a positive attachment of the side curtain 314 relative to the side pad 309.

It should be noted that the side pad 309 may be a fixed frame member which does not include foam. The side pad 309 or foam core 312 may be constructed of any material to ensure the operativeness of the present invention.

As illustrated in FIG. 19, the side curtain 314 includes resilient stays 330 which extend horizontally relative thereto. Resilient stay 340B extends at an angle relative to the resilient stays 330. In addition, the vertical stay 340A is secured to the side curtain 314. Similarly, the vertical stay 340 is secured to the side pad 309. A plurality of fastener attachments 350 may be positioned to extend through apertures in the resilient stays 330 for securing the side curtain 314 relative to the side pad 309.

As illustrated in FIG. 20, a plurality of fastener attachments 350 may be utilized for releasably securing the side curtain 314 relative to the side pad 309.

The present invention is not limited to threaded fastener 351 and a nut 352. Any other mechanical attachment means is contemplated by the present invention. In addition, the arrangement of the fastener attachment 350 as illustrated in FIG. 17 may be reversed wherein the nut 352 may be secured to the side curtain 314 and the threaded fastener 351 may be secured to the side pad 309. In addition, the threaded fastener 351 may be either secured to the side curtain 314 or may be positioned within an aperture in the side curtain 314 for enabling the threaded fastener 351 to be inserted through the aperture for engaging with the nut 352 to mount the side curtain 314 relative to the side pad 309.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A dock closure comprising:
    a side pad adapted for mounting relative to a dock opening;
    a selectively releasable side curtain including a first portion hinged to the side pad and a second portion adapted for being selectively, releasably mounted relative to the side pad, said side curtain being adapted for engaging a side portion of a docking vehicle;
    at least one fastener attachment reinforced with vertical stiffeners secured to the second portion of said side curtain for selectively, releasably securing the side curtain relative to the side pad;
    wherein when said side curtain is in engagement with a docking vehicle, a seal is provided therebetween and wherein when said side curtain is moved to a storage position, the side curtain is out of engagement with a docking vehicle; and
    a retaining member for securing said side curtain to the side pad for holding the side curtain in the out of engagement position.

2. The dock closure according to claim 1, wherein the at least fastener attachment is secured to an edge portion of said side pad for ensuring the correct positioning of said side curtain after the at least fastener attachment is secured.

3. The dock closure according to claim 1, and further including a plurality of fastener attachments arranged along an edge of said side pad and said side curtain for ensuring the correct positioning of said side curtain after the plurality of fastener attachments are engaged.

4. The dock closure according to claim 1, and further including stays disposed relative to said side curtain for stabilizing said side curtain during use and to maintain sealing pressure against the side of a docking vehicle.

5. The dock closure according to claim 1, wherein said at least one fastener attachment includes a plurality of fastener attachments extending along a predetermined length of said side pad and said side curtain.

* * * * *